United States Patent [19]

Todd

[11] Patent Number: 5,301,038
[45] Date of Patent: Apr. 5, 1994

[54] IMAGE PROCESSOR AND METHOD FOR PROCESSING PIXEL DATA

[75] Inventor: Stephen J. P. Todd, Winchester, United Kingdom

[73] Assignee: International Business Machines Corporation, Armonk, N.Y.

[21] Appl. No.: 895,182

[22] Filed: Jun. 5, 1992

Related U.S. Application Data

[63] Continuation of Ser. No. 613,176, Nov. 13, 1990, abandoned.

[30] Foreign Application Priority Data

Mar. 7, 1990 [EP] European Pat. Off. ........ 90302406.5

[51] Int. Cl.⁵ ............... H04N 1/40; G06K 9/40; G06K 9/44
[52] U.S. Cl. .................... 358/455; 358/465; 358/463; 358/530; 358/532; 382/50; 382/54
[58] Field of Search ........... 358/465, 466, 455, 458, 358/456, 448, 463, 75, 80, 530, 532, 534, 462, 445, 447, 443; 382/50, 52, 53, 54; 395/128

[56] References Cited

U.S. PATENT DOCUMENTS

| | | | |
|---|---|---|---|
| 4,371,872 | 2/1983 | Rossman | 340/728 |
| 4,484,349 | 11/1984 | McCubbrey | 382/49 |
| 4,486,785 | 12/1984 | Lasher et al. | |
| 4,547,811 | 10/1985 | Ochi et al. | 358/455 |
| 4,704,605 | 11/1987 | Edelson | 340/728 |
| 4,873,515 | 10/1989 | Dickson et al. | 340/728 |
| 4,908,780 | 3/1990 | Priem et al. | |

FOREIGN PATENT DOCUMENTS

0201972 11/1986 European Pat. Off. .

Primary Examiner—Edward L. Coles, Sr.
Assistant Examiner—Scott A. Rogers
Attorney, Agent, or Firm—Mark S. Walker; William A. Kinnaman, Jr.

[57] ABSTRACT

An image processor has image processing logic for detecting pixel data representing stepped chrominance or luminance transitions characteristic of staircase aliasing in a source image and for producing an output image including selective antialiasing on the detected stepped transitions. The image processing logic operates as a post processor, but is able to give much better results than conventional convolution filtering.

20 Claims, 8 Drawing Sheets

IMAGE PROCESSOR AND METHOD FOR PROCESSING PIXEL DATA

CROSS-REFERENCE TO RELATED APPLICATION

This application is a continuation of application Ser. No. 07/613,176, filed Nov. 13, 1990, now abandoned.

BACKGROUND OF THE INVENTION

1. Field of the Invention

The present invention relates to information handling systems and more particularly to an image processor for producing antialiased images.

2. Description of the Related Art

There are a number of different types of aliasing effects which appear in images. Staircase aliasing is the effect which can be observed on lines and edges which are at an angle to the horizontal and vertical directions on a pixel-based display such as a raster-scanned visual display device or a matrix printer. This invention is directed to reducing staircase aliasing and does not specifically address other aliasing problems such as the Moire patterns associated with sampling aliasing.

Antialiasing is a technique which reduces this effect as perceived when viewing the displayed image by adjusting the intensity of the displayed pixels along the line or edge. It has been proposed to perform antialiasing at various times and in various ways during the generation of the images for display.

Where an image is the result of some rendering process, such as the creation of two-dimensional views of a three-dimensional object in a solid modeling system, the antialiasing can be performed on each edge or line as it is generated. Antialiasing in this manner can be termed prefiltering. This can be performed by a technique termed "supersampling", where extra values are calculated and then averaged. This and other prefiltering approaches, are, however, expensive in terms of processing time.

It has also been suggested to perform antialiasing after an image has been created by convolution filtering. Antialiasing after an image has been created can be termed postfiltering. This technique has the disadvantage, however, of blurring the image too much with the result that even horizontal and vertical lines become blurred.

There is a need, therefore, for another approach to the antialiasing of images which is not as expensive as prefiltering, yet produces better results than convolution filtering. The object of the invention is to fulfill this need.

SUMMARY OF THE INVENTION

In accordance with the invention there is provided an image processor for processing pixel data defining an image and comprising image processing logic for detecting pixel data representing stepped chrominance or luminance transitions characteristic of staircase aliasing in the image and for producing an output image including antialiasing on the detected stepped transitions.

By only performing antialiasing on transitions (edges) which it has detected as manifesting staircasing, an image processor in accordance with the invention is able to give much better results than can be achieved with conventional convolution filtering while still performing post processing of a source image.

Preferably the image processing logic comprises staircase point detection logic for detecting a staircase point at which there is a step in a chrominance or luminance transition from a first or a second side of a line of pixels to the opposing side of the line of pixels, where the line of pixels is a row or a column of image pixels. There are four possible types of steps in the transition since the crossing can be from a first or a second side of a line to the opposing side and the line of pixels can be a row or column.

In order to detect steps in the transitions of all four types, the image processing logic preferably scans the image four times, in each scan a test being made for a different type of staircase point. However, the image processing logic can alternatively treat each pixel position in turn, testing for the four different types of staircase point at each pixel position.

The image processing logic preferably comprises staircase segment logic for finding the far end of first and second staircase segments starting at the staircase point detected by the staircase point detection logic; the staircase segment logic locating the end of a first staircase segment by testing for the position in a first direction along the line of pixels at which the transition ceases to be adjacent said opposing side of the line of pixels and testing for the position in the opposite direction along the line of pixels at which the transition ceases to be adjacent said one side of the line of pixels. Separate logic for the first and second segments can be provided, or common logic can be provided which receives appropriate input information.

The image processing logic comprises image modification logic for testing for predetermined conditions at the end of a staircase segment and for modifying pixel data in accordance with the predetermined condition detected for the staircase segment. The predetermined conditions tested for are:

(a) the transition steps across a further line of pixels;

(b) the transition steps back across the line of pixels; and (c) neither (a) nor (b)

Preferably, the image processor comprises source image storage for a source image and output image storage for the output image and performs an initial operation of copying the source image from the source image storage to the output image storage, then tests the source image in the source image storage to detect pixel data representing stepped chrominance or luminance transitions characteristic of staircase aliasing and modifies data accordingly in the output image storage to produce the out put image including antialiasing on the detected stepped transitions.

The tasks to be performed by the image processing logic are suitable for a parallel processing implementation. This can be achieved by the use of suitable parallel processing hardware. The invention is also suitable for implementation in a data processing system such as conventional computer workstation or intelligent graphics adapter by the provision of appropriate software.

BRIEF DESCRIPTION OF THE DRAWINGS

An embodiment of the present invention is described hereinafter with reference to the accompanying drawings in which.

DESCRIPTION OF THE PREFERRED EMBODIMENT

Figure 1:
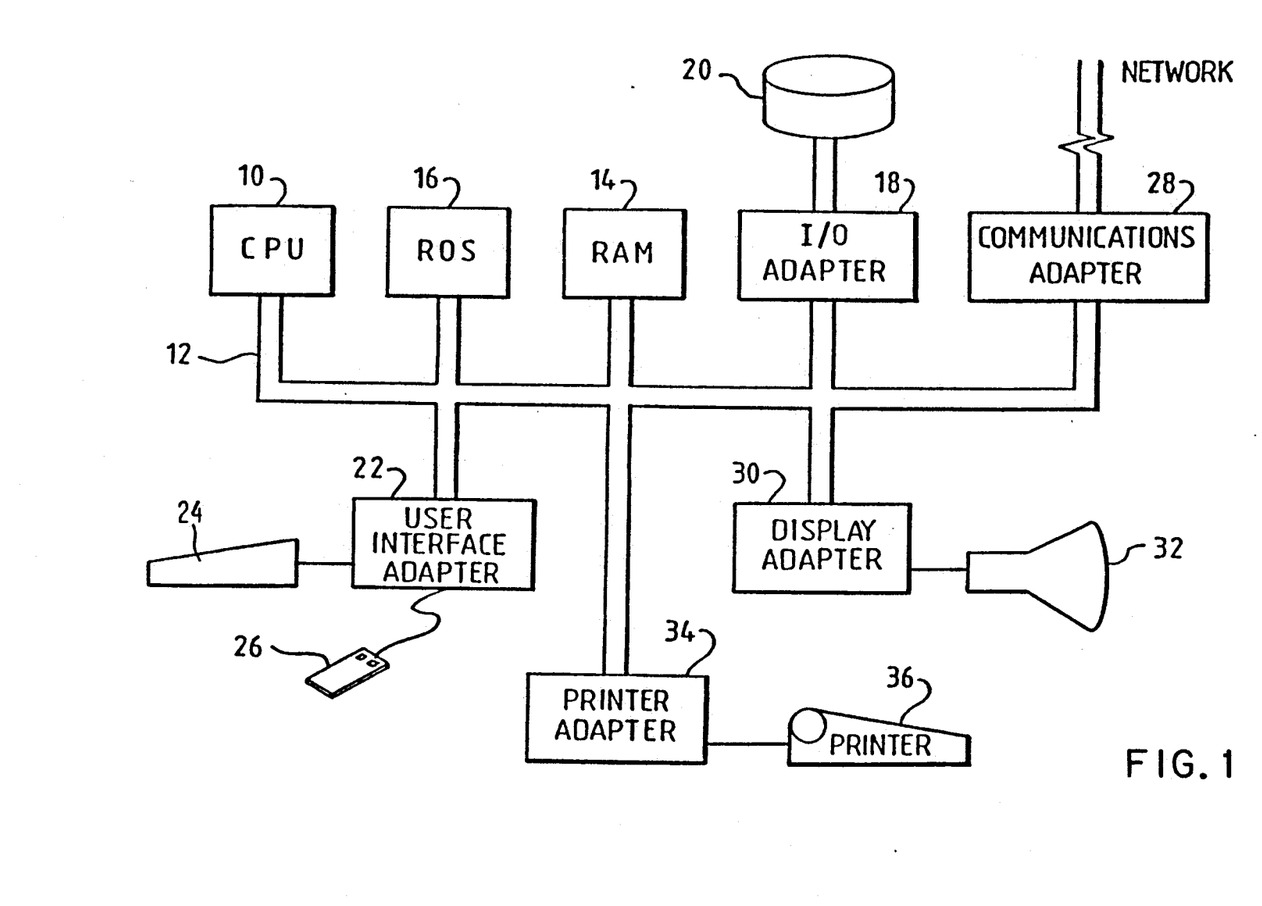
FIG. 1 is an example of an image processing system in the form of a computer workstation.

FIG. 1 illustrates a typical hardware configuration of a workstation with a central processing unit (CPU) 10 (e.g. a conventional microprocessor) and a number of other units interconnected via a system bus 12. The workstation shown in FIG. 1 includes a random access memory (RAM) 14, a read only store (ROS) 16, an I/O adapter 18 for connecting peripheral devices such as disk units 20 to the bus 12, a user interface adapter 22 for connecting a keyboard 24 and mouse 26 or other user interface devices (e.g. a touch screen controller, not shown) to the bus, a communications adapter 28 for connecting the workstation to a data processing network, a display adapter 30 for connecting the bus to a display device 32 (e.g. a CRT monitor) and a printer adapter 34 for connecting the bus to a printing device 36.

The present invention can be implemented on a workstation as shown in FIG. 1 by the provision of appropriate image processing logic as will be described hereinafter. It should be noted that FIG. 1 illustrates only one example of a hardware configuration suitable for implementing the invention. The hardware of the workstation can be adapted to perform specific tasks as required. For example, a television camera may be connected into the system via the display adapter, or otherwise as appropriate, as an image capture device. No details of such further features are given as they are not crucial to the present invention. The invention could equally well be implemented on a mainframe data processing system.

Figure 2:
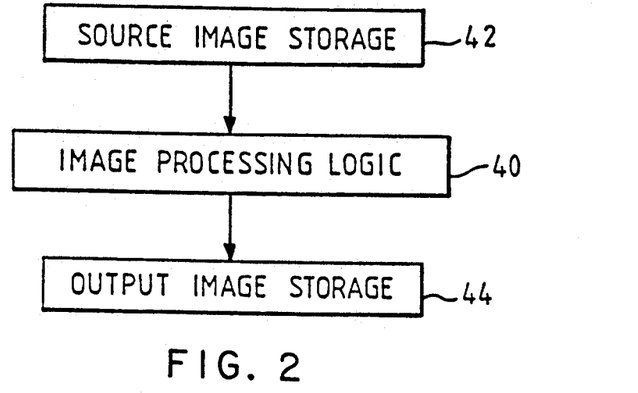
FIG. 2 is a schematic illustrating features of one embodiment of the invention.

FIG. 2 is a schematic illustrating that image processing logic 40 receives pixel data for an image to be rendered from source image storage 42 and outputs the processed image data to an output image storage 44.

In the preferred embodiment the source image storage 42 and the output image storage 44 are first and second sets, respectively, of locations in the workstation RAM 14. The image processing logic 40 is provided by suitable implementing software which is also stored, in use, in the workstation RAM 14 and is used to control the operation of the workstation. The input image will have been derived from an image generator and stored in the source storage 42. How the image is generated is not important here, except to say that it is assumed that the source image contains edges manifesting staircase aliasing.

In the preferred embodiment, the output image storage 44 is a second set of locations in the workstation RAM 14.

Figure 3:
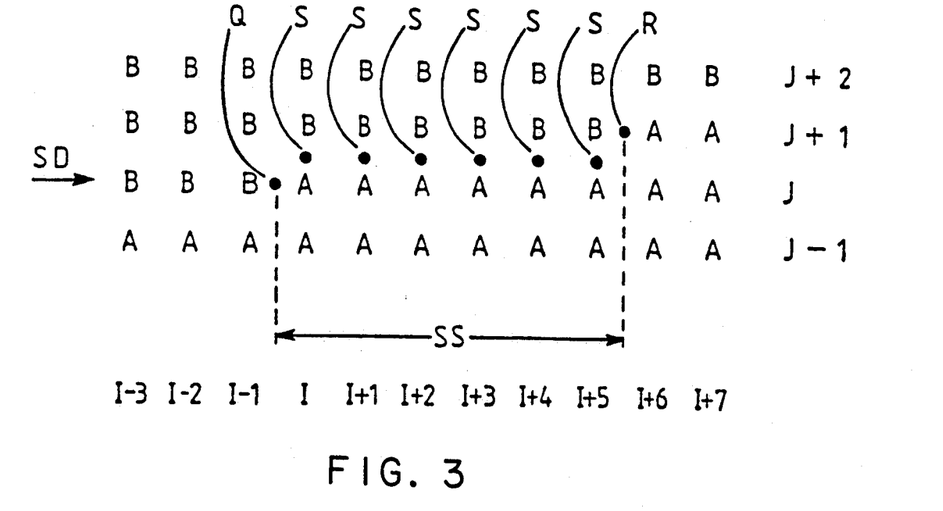
FIG. 3 represents a block of pixels forming part of an image manifesting staircase aliasing.

FIG. 3 illustrates a block of pixels forming part of an image. Each letter "A", or "B" represents a pixel, not a displayed character symbol. The pixels are assumed to have one of two colors "A" or "B" in FIG. 3. It should be noted that the image may contain pixels having many more colors or intensities. For ease of explanation, let us assume that the color "A" relates to a first area and the color B to a second area. The transition between the area "A" and the area "B" forms a stepped transition between those areas representing an edge which is neither horizontal nor vertical, but lies at an angle. The image has not been antialiased as a step-like edge can be clearly seen.

The points indicated "Q" and "R" are said to be staircase points. A staircase point is a point where the transition, or edge, between the areas which is generally angled in a first direction (here the line is approximately horizontal) moves one pixel line in the orthogonal direction (here vertically). A staircase point is defined between pixels, not centered on a pixel, in a given pixel row or column. In FIG. 3, there is a staircase point "Q" in the row "J" and a staircase point "R" in the row $J+1$. There are four different types of staircase points. The four types, two of which occur in rows and two of which occur in columns, are illustrated in FIG. 5 and described below.

The points labelled "S" form what is termed a staircase segment "SS", which is defined as the segment of an edge between one staircase point and the next. The staircase segment lies between two rows or columns (here between the rows "J" and "$J+1$") depending on whether the edge is nearer to being horizontal or vertical.

Figure 4:
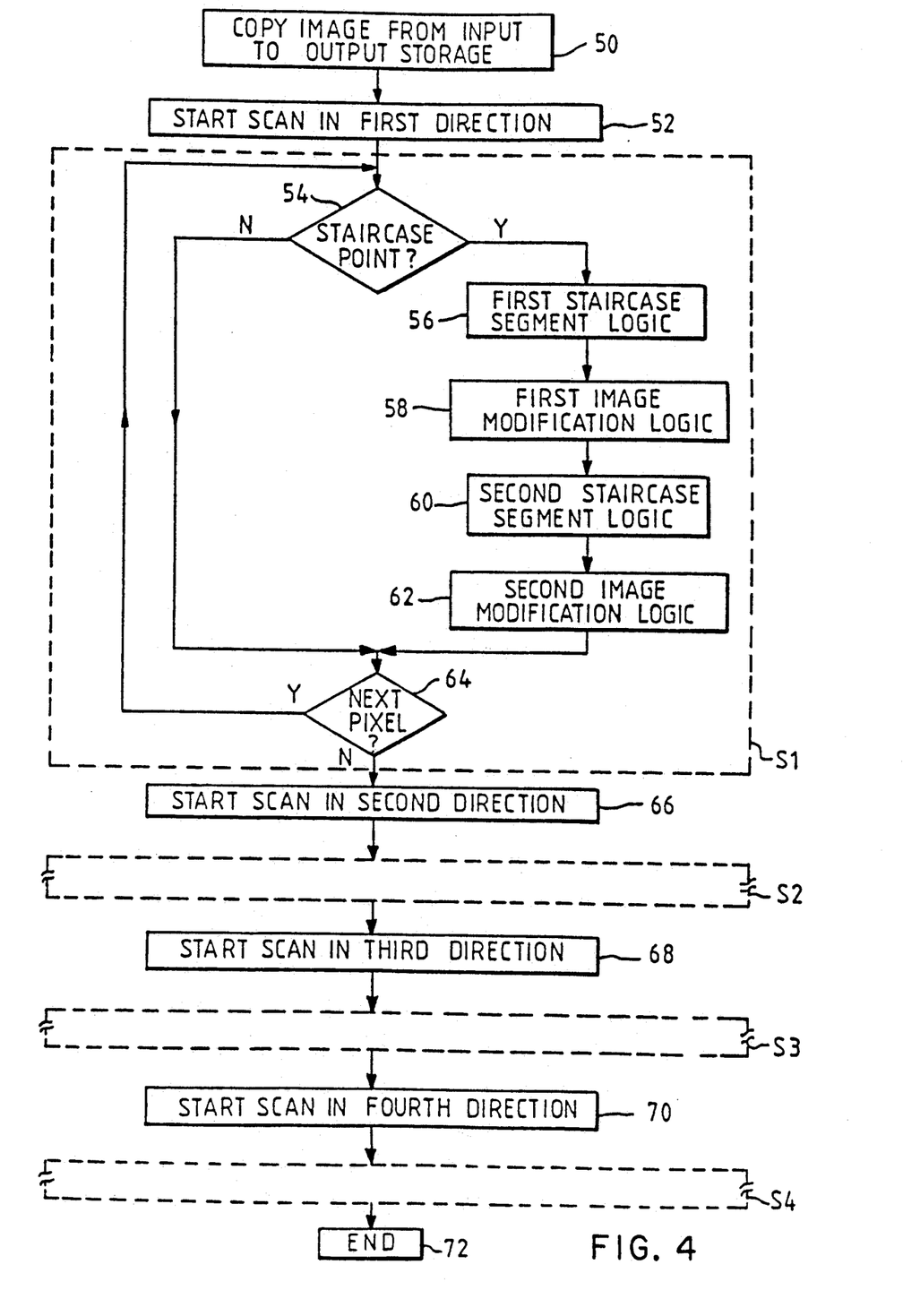
FIG. 4 is an overview of logic for selective antialiasing of an image.
Figure 5A:
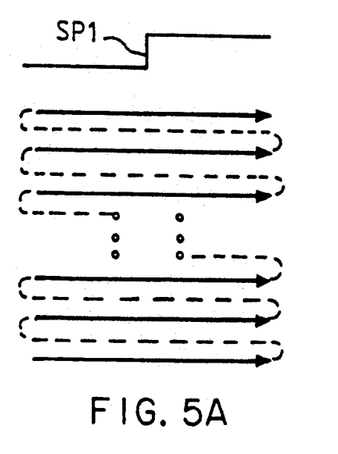
FIGS. 5A-5D represent a number of different patterns for scanning an image and the transition steps thus detected.
Figure 5B:
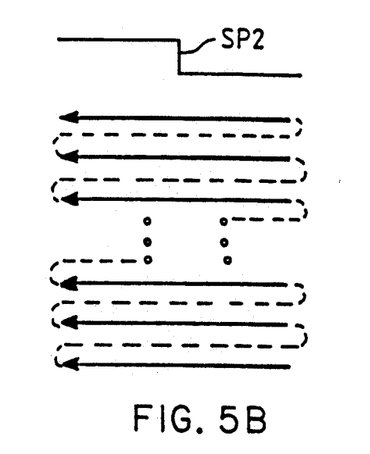
Figure 5C:
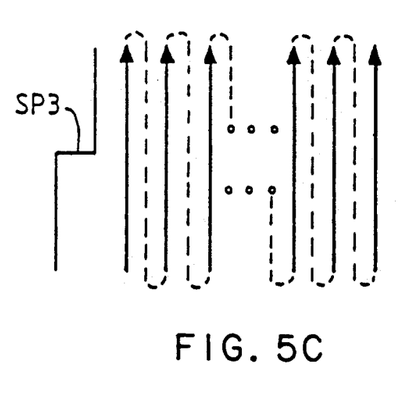
Figure 5D:
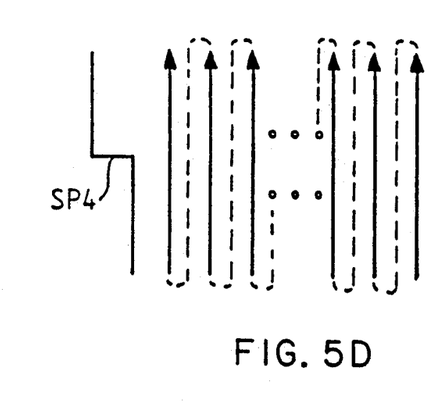

FIG. 4 illustrates logic for analyzing the image in the source storage in order to detect edges such as that shown in FIG. 3 and to store a modified version of the image in the output storage. The effect of the processing is to produce a modified image in which the staircasing effect has been reduced by selective antialiasing.

The image processing logic operates by firstly copying (50) the input image from the input storage 42 to the output storage 44, then completely scanning the image in the input storage four times (S1, S2, S3, S4) and updating the output image on detection of each staircase edge segment. Each of the four scans through the input image takes the pixels in a different order and applies a test for a different type of staircase point. When a staircase point is detected, the image processing logic tests how long the staircase segment is either side of the staircase point in the current line (row or column) of pixels and modifies the output image data depending on the type of staircase segment detected. In this way, by the end of the fourth scan, all staircase segments in the source image are detected and the corresponding data in the output image modified appropriately.

FIG. 5 represents the scan directions for the present example of the invention. The first scan (FIG. 5A) starts in the bottom left hand corner of the image, and scans each row of the image in turn progressing up the image, with the rows being scanned from left to right. The line SP1 over the image array in FIG. 5A represents the shape of the transition tested for in the first scan, this shape of transition forms the first type of staircase point and corresponds to the shape of transition at the point Q in FIGS. 3 and 6. The second scan (FIG. 5B) then starts from the bottom right of the image and scans each row in turn progressing up the image with each row being scanned from right to left. The line SP2 over the image array in FIG. 5B represents the shape of the transition tested for in the second scan, this shape of transition forming the second type of staircase point. The third scan (FIG. 5C) starts from the bottom left of the image and scans each column of the image progressing from left to right, with each column being scanned from bottom to top. The line SP3 to the left of the image array in FIG. 5C represents the shape of the transition tested for in the third scan, this shape of transition forming the third type of staircase point. The fourth scan (FIG. 5D) starts from the bottom right of the image and scans each column progressing from right to left across the image with each column being scanned from bottom to top. The line SP4 to the left of the image array in FIG. 5D represents the shape of the transition tested for in the fourth scan, this shape of transition forming the fourth type of staircase point.

It will be apparent from the following, however, that different scanning directions or a different order of performing the scans could be used to successfully identify and modify all the staircase segments in the source image.

Returning to FIG. 4, the logic starts (50) by copying the image from the source 42 to the destination storage 44. In the following, it is assumed that the image is stored in memory as a two dimensional array of pixels. Although the image will normally be representative of a rectangular array of image pixels, the data defining the pixels may be stored in any appropriate data structure, for example as a series of lists or linked lists as will be apparent to one skilled in the art. The image processing logic includes or is able to control appropriate addressing logic for accessing the data for pixels at desired row and column locations within the array in a conventional manner.

The image processing logic starts the first image scan (52, S1) and staircase point detection logic 54 tests successive pixels in turn for a staircase point. A staircase point is detected for a row J between a pixel (P(J,I−1)) at column (I−1) and a pixel (P(J,I)) at column (I) when the following condition C1 is satisfied:

$$(P(J,I) \text{ NOTSAME } P(J + 1,I)) \text{ AND} \quad (C1)$$
$$(P(J,I) \text{ SAME } P(J - 1,I - 1)) \text{ AND}$$
$$(P(J + 1,I) \text{ SAME } P(J,I - 1))$$

Figure 6:
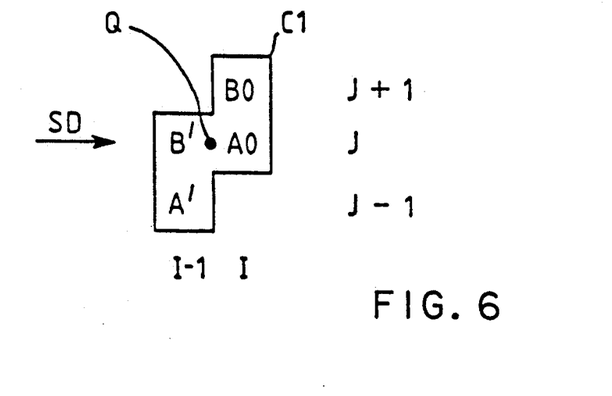
FIG. 6 represents part of an image used for explaining the detection of a staircase point in an image.

An example of this condition is illustrated in FIG. 6 where P(J,I) and P(J−1,I−1) have the values "A0" and "A'" and P(J+1,I) and P(J,I−1) have the values "B0" and "B'" respectively It should be noted that the function "SAME" used in the above condition need not mean exact equality. Indeed, in view of the vast range of different chrominance and luminance values which may be specified in an image, it is preferable that "SAME" is defined such that positive result is obtained when the pixels being compared differ by an amount which will be determined to be acceptable in a given case, e.g. by trial and error. In the case of a gray scale (monochrome) image, SAME detects a given intensity difference threshold. In a multicolor image, it detects a given intensity difference threshold in any of the colors (usually the red, green, blue primary colors) specified in the image. "NOTSAME" gives a positive result for those cases where a negative result would be obtained from the function "SAME".

If the staircase point detection logic 54 finds no staircase point for a given pixel, and pixels remain for the current scan (64), then the next pixel to be scanned in the scan direction SD is selected and the staircase point detection logic 54 applies the condition C1 for this next pixel.

If the staircase point detection logic 54 does find a staircase point, then first staircase segment logic 56 tests for the length of the staircase segment adjacent to the staircase segment in the scan direction SD. This is done by further scanning along the line of pixels from pixel position I in the scanning direction SD and, at each pixel position, testing whether the following condition C2 is satisfied:

$$(P(J,I + 1) \text{ SAME } P(J,I + i)) \text{ AND} \quad (C2)$$
$$(P(J + 1,I + i) \text{ SAME } P(J + 1,I + i - 1)) \text{ AND}$$
$$(P(J,I + i) \text{ NOTSAME } P(J + 1,I + i))$$

where i = 1, 2, 3, . . . for successive pixels

Figure 7:
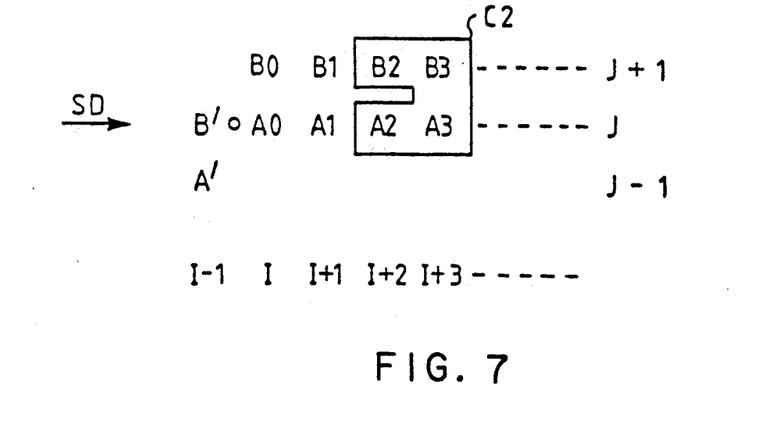
FIG. 7 represents part of an image used for explaining the detection of a staircase segment adjacent a staircase point in the image scanning direction.

FIG. 7 illustrates a block of pixels forming part of an image with the boundary labelled C2 indicating the pixels tested for i=3. The first staircase segment logic 56 continues to increment the value of "i" until the condition C2 is no longer satisfied or the end of the current scan line is reached. The point where the condition C2 ceases to be satisfied is determined to be the end of a staircase segment (compare point "R", FIG. 2). In this case, the first staircase segment logic 56 passes the number of pixels scanned and the location of the starting and finishing locations of the staircase segment to first image modification logic 58 for modifying the output image storage to remove the staircasing effect.

There are three cases which can occur at the end of a staircase segment. The modification which is performed to the pixel data in the output image depends on the case which is detected at the end of the segment.

In order to determine which of these three cases exists, the first image modification logic 58 tests to see which case applies and then modifies the data at approximate locations in the output image.

Figure 8A:
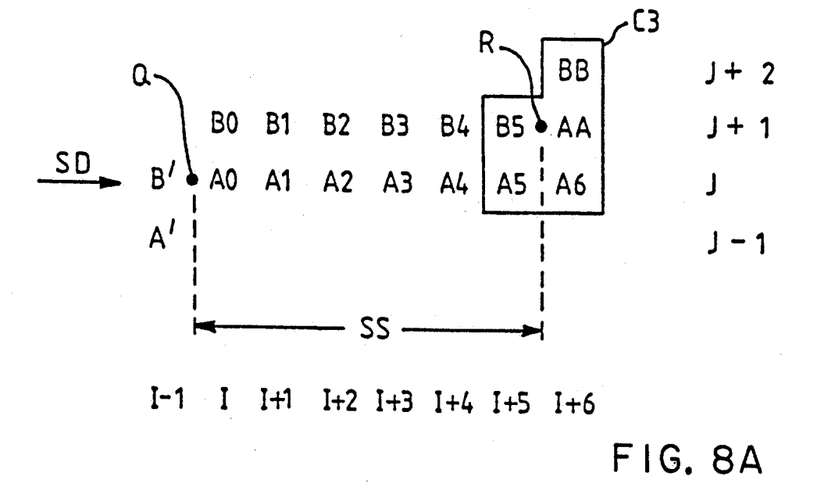
FIGS. 8A and 8B represent a part of an image before and after modification for a first type of staircase segment.

One of the three cases tested for is where the edge between the areas in the image continues in the same general direction as before. An example of this is illustrated in FIG. 8A. The staircase segment in FIG. 8A extends between the staircase points "Q" and "R".

The first staircase segment logic 58 tests whether the following condition C3 is met for the point at the end of the segment:

$$(P(J,I + k - 1) \text{ SAME } (P(J,I + k)) \text{ AND} \quad (C3)$$
$$(P(J + 1,I + k) \text{ SAME } P(J,I + k)) \text{ and}$$
$$(P(J + 2,I + k) \text{ SAME } P(J + 1,I + k - 1))$$

where k is the number of pixels (in FIG. 8A, 6 pixels) stepped in the scanning direction by the logic 56 until the condition C2 ceased to be satisfied.

Figure 8B:
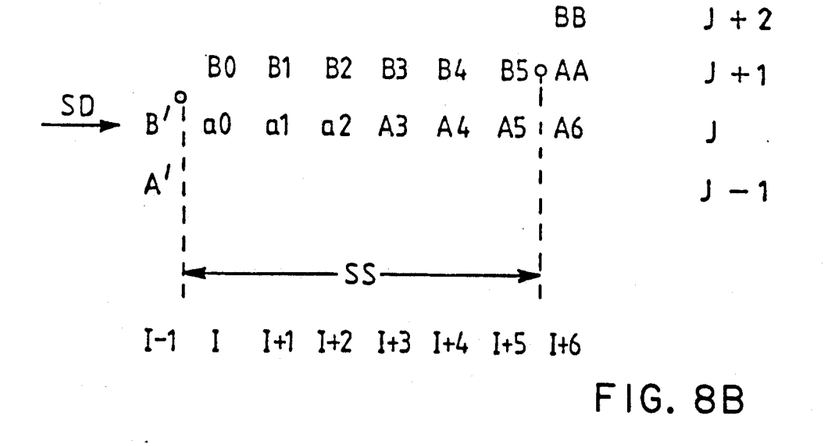

If the condition C3 is satisfied then replacements are made to the pixel data at the locations in the output storage corresponding to the pixels in the first half (in the scanning direction) of the segment SS. FIG. 8B represents the part of the image illustrated in FIG. 8A as modified by the image modification logic 58, where:

$$a0 = 7*A0/12 + 5*B0/12$$

$$a1 = 9*A1/12 + 3*B1/12$$

$$a2 = 11*A2/12 + 1*B2/12$$

The denominators in the above expressions (here 12) are derived as 2*k (i.e. two times the number of pixels stepped by the logic 56) and the multipliers for the numerators are determined as a smooth function based on the denominator. In particular, in the above case:

$$ai = ((k+2i+1)/2k)*Ai + ((k-2i-1)/2k)*Bi$$

The result of the above modifications is to set the chrominance or luminance values for the modified pixels at particular values between those of the pixels adjacent each side of the transition at that position in the source image. It should be noted that the pixel values for B3, B4 and B5 will be modified by the second image modification logic 62 when this staircase segment SS is detected, during the processing of the next row (J+1), by the second staircase segment logic 60 following detection of the staircase point "R" by the staircase point detection logic 54.

Figure 9A:
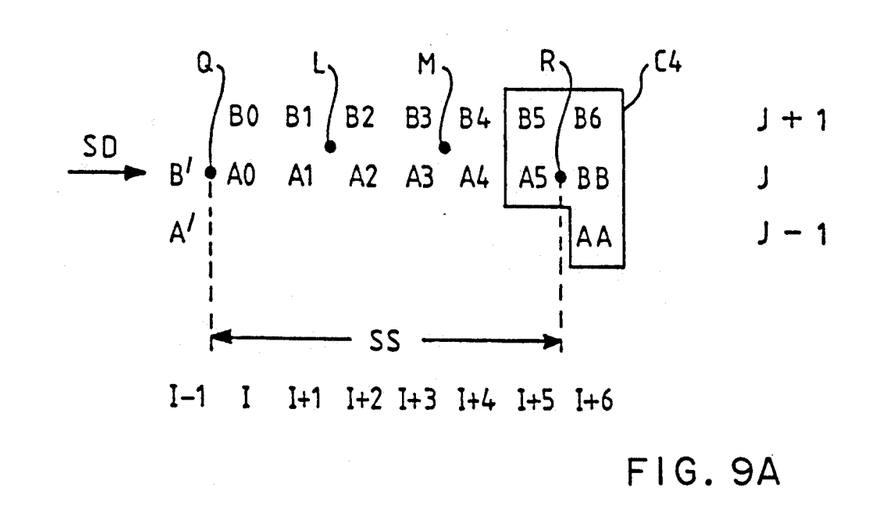
FIGS. 9A and 9B represent a part of an image before and after modification for a second type of staircase segment.

The second of the three cases tested for is where the edge between the areas in the image turns to form part of an arc. An example of this is illustrated in FIG. 9A. The staircase segment in FIG. 9A extends between the staircase points "Q" and "R".

The first image modification logic 58 tests whether the following condition C4 is met for the point at the end of the segment:

$$(P(J + 1, J + k) \text{ SAME } P(J + 1, J + k - 1)) \text{ AND}$$ (C4)
$$(P(J + 1, J + k) \text{ SAME } P(J, J + k)) \text{ AND}$$
$$(P(J - 1, J + k) \text{ SAME } P(J, J + k - 1))$$

where k is, once more, the number of pixels (in FIG. 9A, 6 pixels) stepped in the scanning direction by the logic 56 until the condition C2 ceased to be satisfied.

Figure 9B:
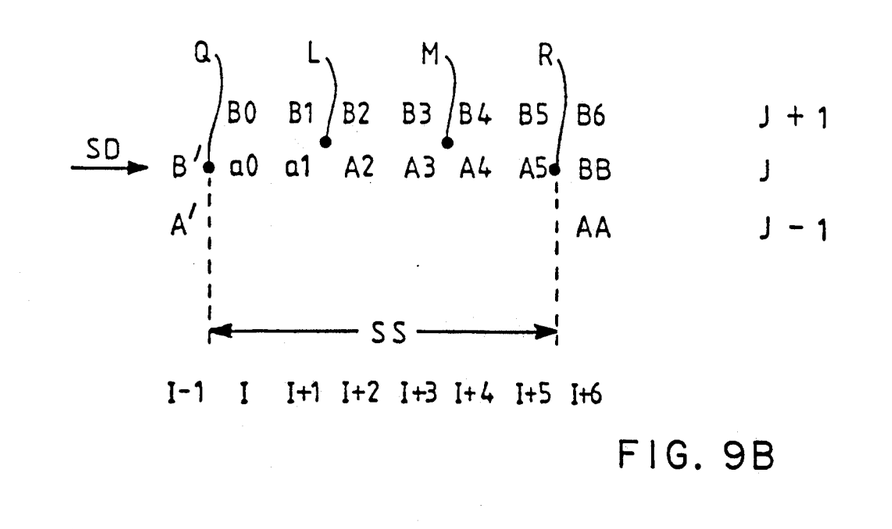

If the condition C4 is satisfied then it is assumed that the edge traces an arc which can be divided into three sub-segments Q-L, L-M, M-R—see FIG. 9A. The pixel data is then modified at locations in the output storage corresponding to the pixels in the first of these three sub-segments Q-L. FIG. 9B represents the part of the image illustrated in FIG. 9A as modified by the first image modification logic 58, where:

$$a0 = 5*A0/12 + 3*B0/12$$

$$a1 = 7*A1/12 + 1*B1/12$$

The general equation for ai can readily be determined from the above example. It should be noted that A4 and A5 will be modified independently when the point "R" is located as a staircase point during the second full scan of the image.

Figure 10A:
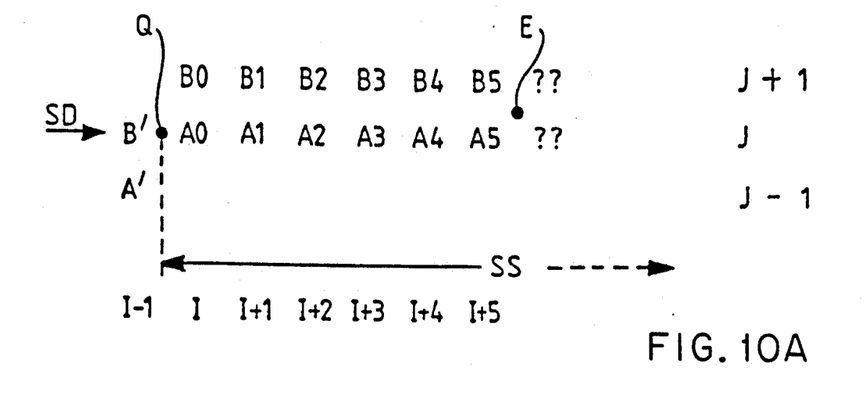
FIGS. 10A and 10B represent a part of an image before and after modification for a third type of staircase segment.
Figure 10B:
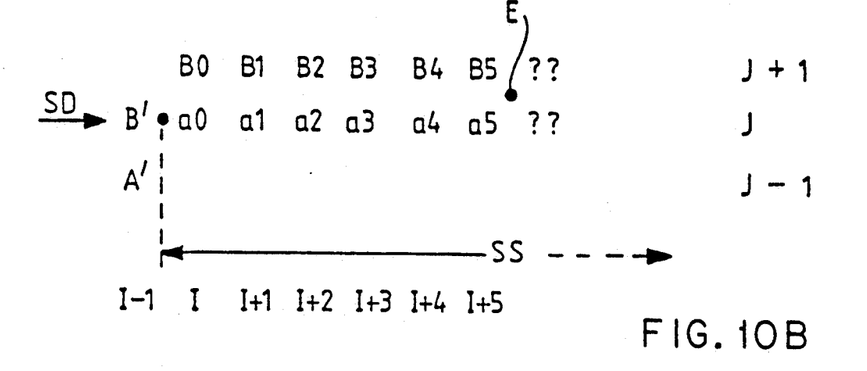

The third case is where neither condition C3, nor condition C4 has been satisfied. This can occur where the edge of the image was encountered during scanning along the staircase segment, where the areas A and B merge into one another, or where another edge breaks in. In this case the edge is assumed to lie on the line (not shown) joining "Q" and "E". FIG. 10A represents this condition.

Where neither condition C3 nor condition C4 are identified, the first image modification logic 58 makes the assumption the end of the segment is midway between the point "Q" and the next staircase point and modifies the pixel data at locations corresponding to all of the points in the current scan line from "Q" to "E". FIG. 10B represents the portion of the image represented in FIG. 10A as modified by the image modification logic 58, where:

$$a0 = 13*A0/24 + 11*B0/24$$

$$a1 = 15*A1/24 + 9*B1/24$$

$$a2 = 17*A2/24 + 7*B2/24$$

$$a3 = 19*A3/24 + 5*B0/24$$

$$a4 = 21*A1/24 + 3*B1/24$$

$$a5 = 23*B2/24 + 1*B2/24$$

The denominators in the above expressions (here 24) are derived as 4*k (i.e. two times the number of pixels stepped by the logic 56) and the multipliers for the numerators are determined as a smooth function based on the denominator. This function can readily be determined from the above example.

When the first image modification logic 58 has modified the pixel data in the output storage for the current line segment, the second staircase segment detection logic 60 tests for the length of the staircase segment adjacent to the staircase segment in direction SD' opposite to the scan direction SD. This is done by scanning back along the line of pixels in the direction SD' from pixel position I and, at each pixel location, testing whether the following condition C5 is satisfied:

$$(P(J, J - i) \text{ SAME } P(J, J - i + 1)) \text{ AND}$$ (C5)
$$(P(J - 1, J - i) \text{ SAME } P(J - 1, J - i + 1)) \text{ AND}$$
$$(P(J, J - i) \text{ NOTSAME } P(J - 1, J - i))$$

where i = 2, 3, 4, . . . for successive pixels.

Figure 11:
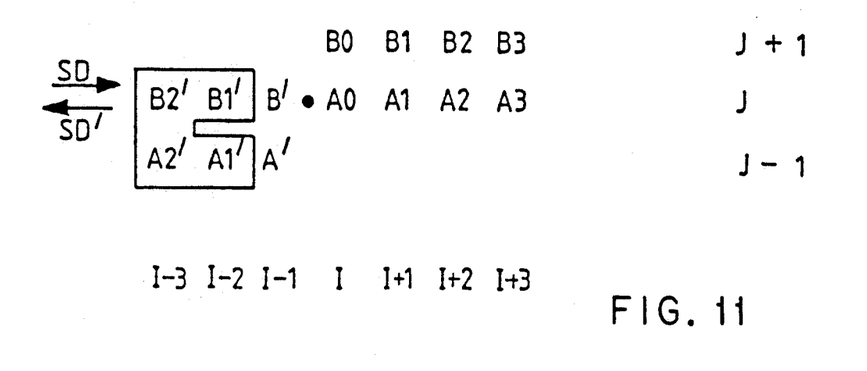
FIG. 11 represents part of an image used for explaining the detection of a staircase segment adjacent a staircase point in the opposite direction to the image scanning direction.

FIG. 11 illustrates a block of pixels forming part of an image with the boundary labelled C5 indicating the pixels tested for i=2. The second staircase segment detection logic 60 continues to increment the value of 'i' until the condition C5 is no longer satisfied or the beginning of the current scan line is reached. The point where the condition C5 ceased to be satisfied is determined to be the end of a staircase segment. In this case, the second staircase segment detection logic 60 passes the number of pixels scanned and the location of the starting and finishing locations of the staircase segment to second image modification logic 62 for modifying the output image storage to remove the staircasing effect.

As with the first image modification logic, the second image modification logic detects one of three possible cases:

1) the transition in the image continues in the same general direction (compare FIGS. 8A and 8B);
2) the transition in the image traces an arc (compare FIGS. 9A and 9B);
3) neither of the above (e.g the edge of the image was encountered during scanning back along the staircase segment, the areas A and B merge into one another, or another edge breaks in).

The second image modification logic 62 detects these cases by testing for conditions comparable to those described with reference to FIGS. 8A, 8B, 9A, 9B, 10A and 10B, but modified to take account of the opposed scanning direction. The conditions used are not described herein but can be readily derived from the conditions C3 and C4 above after comparison of the differences between conditions C2 and C5. Similarly, the modifications performed on the image in the output storage by the second image modification logic 62 in response to the detection of these conditions being met can be derived readily from the description of the equivalent cases for the scanning direction SD.

When the second image modification logic 62 has modified the pixel data in the output storage for the current line segment, or in the case when the second staircase segment detection logic 60 did not detect a staircase segment in the scan direction, the processing is continued for the next pixel to be considered in the scanning direction SD.

When the last pixel in the first full scan has been reached, the image processing logic 40 starts (66) the second full scan of the image in the input storage 42 and modifies the image in the output storage 44 by second scan logic S2 corresponding generally to the first scanning logic S1. The second scanning logic S2 only differs in so far as to take account of the different scanning order. The details of the second scanning logic are not described as they can be derived readily from what has already been described above.

The same applies for the third full scan (68, S3) and the fourth full scan (70, S4) of the image. On completion of the fourth full scan (72), all the stepped transitions in the source image will have been antialiased in the output image.

Although specific examples of the invention are described herein, the invention is not limited thereto and many modifications and alterations are possible.

For example, although a preferred implementation of the invention is described in which the source image storage 42 and the output image storage 44 are first and second sets, respectively, of locations in the workstation RAM 14 and the image processing logic 40 is provided by suitable implementing software which is also stored, in use, in the workstation RAM. this need not be the case. One or both of the image stores 42 and 44 may be provided by special-purpose storage; for example, the output storage 44 may be a display buffer used directly for driving a display device Also, the image processing logic 40 may be provided by special-purpose hardware. For example, the image processing logic may be provided by an array of special-purpose processing elements, or by a programmable logic array, or any other suitable hardware means.

Also, although a particular set of scan directions are described, it will be appreciated that the array may be scanned in a different combination of directions or in a different order and still detect all the stepped transitions to be antialiased.

In the above example, the image processing logic scans the image array four times, each time in a different pixel order. In each scan a test is applied to identify a particular type of staircase point. When a staircase point is detected, the length and type of staircase segment to each side of the staircase point are determined and appropriate modifications made to the output image. This approach can be described by the following logical statements:

---
For each type of staircase point (scan)
... For all pixels
... Modify data for staircase segments
---

However, the image processing logic 40 could be arranged to examine each pixel position in turn; at each pixel position testing for four different types of staircase point. As in the particular example of the invention described above, when a staircase point is detected, the length and the type of staircase segment to each side of the staircase point are determined and appropriate modifications made to the output image. This approach can be described by the following logical statements:

---
For all pixels
... For each type of staircase point
... Modify data for staircase segments
---

As the two outer loops are the same in both cases, it can be seen that the operations of modifying data for the staircase segments can be performed in parallel on suitable processing equipment.

Instead of treating each segment separately, a group of segments could be detected and curve-fitting techniques applied to determine the path of the transition through those segments.

Although in the example described above, there are separate source and output image stores, it would be possible to use a single image store for both the source and output images. In this case, however, as the source image will be modified during processing, determining the necessary modifications to the pixel data would be more complicated.

Although particular antialiasing functions are described for modifying the output pixels, it will be appreciated that other functions could be adapted depending on the effects it is desired to achieve.

It should be noted that the antialiasing can be applied equally well to the antialiasing of images for display on a visual display device such as a computer monitor and on a printer with multilevel or pseudohalftone capability.

What is claimed is:

1. An image processor for processing pixel data defining an image, said pixel data defining an intensity for each of a plurality of pixels having a plurality of gradations between a predetermined minimum and maximum, said image processor including image processing logic comprising:

means for determining the intensity difference between adjacent pixels of said image;

means for comparing said intensity difference with a predetermined nonzero threshold that is less than the difference between said predetermined minimum and said predetermined maximum to detect stepped intensity transitions characteristic of staircase aliasing in the image;

means for determining a stepped intensity range indicating the range of pixels through which said intensity remains essentially constant;

means for determining an antialiased pixel value for each of said range of pixels, said antialiased pixel value being a function of said range and said adjacent pixel intensities; and means for producing an output image including said antialiased pixel values on the detected stepped transitions.

2. An image processor as claimed in claim 1 wherein the image processing logic comprises staircase point detection logic for detecting a staircase point at which there is a step in an intensity transition from one side of a line of pixels to the opposing side of the line of pixels, where the line of pixels is a row or a column of image pixels.

3. An image processor as claimed in claim 2 wherein the image processing logic comprises staircase segment logic for finding the far end of first and second staircase segments starting at the staircase point detected by the staircase point detection logic; the staircase segment logic locating the end of a first staircase segment by testing for the position in a first direction along the line of pixels at which the transition ceases to be adjacent said opposing side of the line of pixels and testing for the position in the opposite direction along the line of pixels at which the transition ceases to be adjacent said one said of the line of pixels.

4. An image processor as claimed in claim 3 wherein the image processing logic comprises image modification logic for testing for predetermined conditions at the end of a staircase segment.

5. An image processor as claimed in claim 4 wherein the image modification logic modifies the pixel data in accordance with the predetermined condition detected for the staircase segment.

6. An image processor as claimed in claim 5 wherein the predetermined conditions tested for are:
 (a) the transition steps across a further line of pixels;
 (b) the transition steps back across the line of pixels; and
 (c) neither (a) nor (b).

7. An image processor as claimed in claim 1 in which the image processing logic scans the image for times, in each scan a test being made for a different type of staircase point.

8. An image processor as claimed in claim 7 wherein the image processing logic performs a plurality of operations in parallel.

9. An image processor as claimed in claim 1 in which the image processing logic treats each pixel position in turn, for each pixel position testing for four different types of staircase point.

10. An image processor as claimed in claim 9 wherein the image processing logic performs a plurality of operations in parallel.

11. An image processor as claimed in claim 1 comprising source image storage for a source image and output image storage for the output image wherein the image processing logic performs an initial operation of copying the source image from the source image storage to the output image storage, the image processing logic then testing the source image in the source image storage to detect pixel data representing stepped intensity transitions characteristic of staircase aliasing and modifying data accordingly in the output image storage to produce the output image including antialiasing on the detected stepped transitions.

12. A data processing system comprising an image processor as claimed in claim 1.

13. An image processor as in claim 1 in which said pixel data defines an intensity for each of a plurality of colors for said pixels and in which intensity differences between adjacent pixels of said image in excess of a predetermined threshold for any of said colors are detected to detect said stepped transitions.

14. In a graphics system in which a two-dimensional image consisting of rows and columns of pixels is generated for display by a raster scan device, said image being represented by pixel data defining an intensity for each of said pixels having a plurality of gradations between a predetermined minimum and maximum, a method for processing said pixel data comprising the steps of:
 determining the intensity differences between adjacent pixels of said image;
 comparing said intensity differences with a predetermined nonzero threshold that is less than the difference between said predetermined minimum and said predetermined maximum to detect stepped transitions characteristic of staircase aliasing in said image;
 determining a stepped intensity range indicating the range of pixels through which said intensity remains essentially constant;
 determining an antialiased pixel value for each of said range of pixels, said antialiased pixel value being a function of said range and said adjacent pixel intensities; and
 modifying said pixel data for pixels along said detected transitions to product an output image including said antialiased pixel values along said transitions.

15. A method as in claim 14 in which each of said transitions has a segment extending along a line of pixels between a first end and a second end, said modifying step comprising the steps of:
 testing for a predetermined condition at one end of a segment; and
 modifying said pixel data for pixels along said segment in accordance with the predetermined condition detected at said one end of said segment.

16. A method as in claim 15 in which said one end of said segment is tested for the stepping of said transition across a further line of pixels.

17. A method as in claim 15 in which said one end of said segment is tested for the stepping of said transition back across said line of pixels.

18. A method as in claim 15 in which said one end of said segment is tested for the absence of a stepping of said transition back across said line of pixels or across a further line of pixels.

19. A method as in claim 14 in which said pixel data defines an intensity for each of a plurality of colors for said pixels and in which intensity differences between adjacent pixels of said image in excess of a predetermined threshold for any of said colors are detected to detect said stepped transitions.

20. A method as in claim 14 in which said pixel data is modified by blending intensity values for pixels on either said of said transitions.

* * * * *